(12) United States Patent
Suzuki (10) Patent No.: US 11,595,542 B2
(45) Date of Patent: Feb. 28, 2023

(54) READING APPARATUS AND METHOD

(71) Applicant: TOSHIBA TEC KABUSHIKI KAISHA, Tokyo (JP)

(72) Inventor: Katsunori Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 17/343,272

(22) Filed: Jun. 9, 2021

(65) Prior Publication Data

US 2022/0094808 A1 Mar. 24, 2022

(30) Foreign Application Priority Data

Sep. 23, 2020 (JP) .............................. JP2020-158904

(51) Int. Cl.
*H04N 1/32* (2006.01)
*G06K 7/10* (2006.01)

(52) U.S. Cl.
CPC ..... *H04N 1/32138* (2013.01); *G06K 7/10237* (2013.01); *H04N 1/32144* (2013.01)

(58) Field of Classification Search
CPC .......... H04N 1/32138; H04N 1/32144; G06K 7/10237; G06K 1/18; G06K 7/1097
See application file for complete search history.

(56) References Cited

U.S. PATENT DOCUMENTS

2015/0222783 A1* 8/2015 Choi .................. H04N 1/00342
235/375

FOREIGN PATENT DOCUMENTS

| JP | 2002-269508 A | 9/2002 |
|---|---|---|
| JP | 2008-047966 A | 2/2008 |
| JP | 2008-060788 A | 3/2008 |
| JP | 2009-177379 A | 8/2009 |

* cited by examiner

*Primary Examiner* — Christopher Wait
(74) *Attorney, Agent, or Firm* — Foley & Lardner LLP (57) ABSTRACT

A reading apparatus includes a communication unit, a scanner, and a processor. The communication unit communicates with a wireless tag provided on paper. The scanner scans the paper. The processor acquires data from the wireless tag through the communication unit, acquires an image from the paper by using the scanner, and generates a file in which the data is embedded in the image as hidden characters.

15 Claims, 8 Drawing Sheets

| USER | TID | UII | Reserved |

```
SCREEN FOR RFID DATA
PLEASE SELECT TAG TO SPECIFY.
```

| |
|---|
| [ID] |
| [Sub-ID] |
| [PRODUCT NAME] |
| [QUANTITY] |
| [NOTE] |
| [SENDER] |
| [DESTINATION] |

91

OK   CANCEL

READING APPARATUS AND METHOD

CROSS-REFERENCE TO RELATED APPLICATION

This application is based upon and claims the benefit of priority from Japanese Patent Application No. 2020-158904, filed on Sep. 23, 2020 the entire contents of which are incorporated herein by reference.

FIELD

Embodiments described herein relate generally to a reading apparatus and a method.

BACKGROUND

Paper with wireless tags, such as radio frequency identifier (RFID) tags, is known. Images may be printed on such paper.

In the related art, an information processing apparatus needs to create a table or the like to link the image printed on paper and the data stored in the wireless tag and manage both thereof.

DETAILED DESCRIPTION

In order to solve the above problems, a reading apparatus and a method for effectively managing the image printed on the paper provided with the wireless tag and the data stored in the wireless tag are provided.

In general, according to at least one embodiment, a reading apparatus includes a communication unit (communication interface), a scanner, and a processor. The communication unit communicates with a wireless tag provided on paper. The scanner scans the paper. The processor acquires data from the wireless tag through the communication unit, acquires an image from the paper by using the scanner, and generates a file in which the data is embedded in the image as hidden characters.

Hereinafter, at least one embodiment will be described with reference to drawings.

An image processing apparatus according to at least one embodiment reads an image printed on paper (wireless tag paper) provided with a wireless tag such as a radio frequency identifier (RFID) tag. The image processing apparatus also reads data from the wireless tag. An image processing apparatus 1 generates a file in which an image and data are associated with each other.

Further, the image processing apparatus may print an image on wireless tag paper using toner. The image processing apparatus may store data in a wireless tag.

Figure 1:
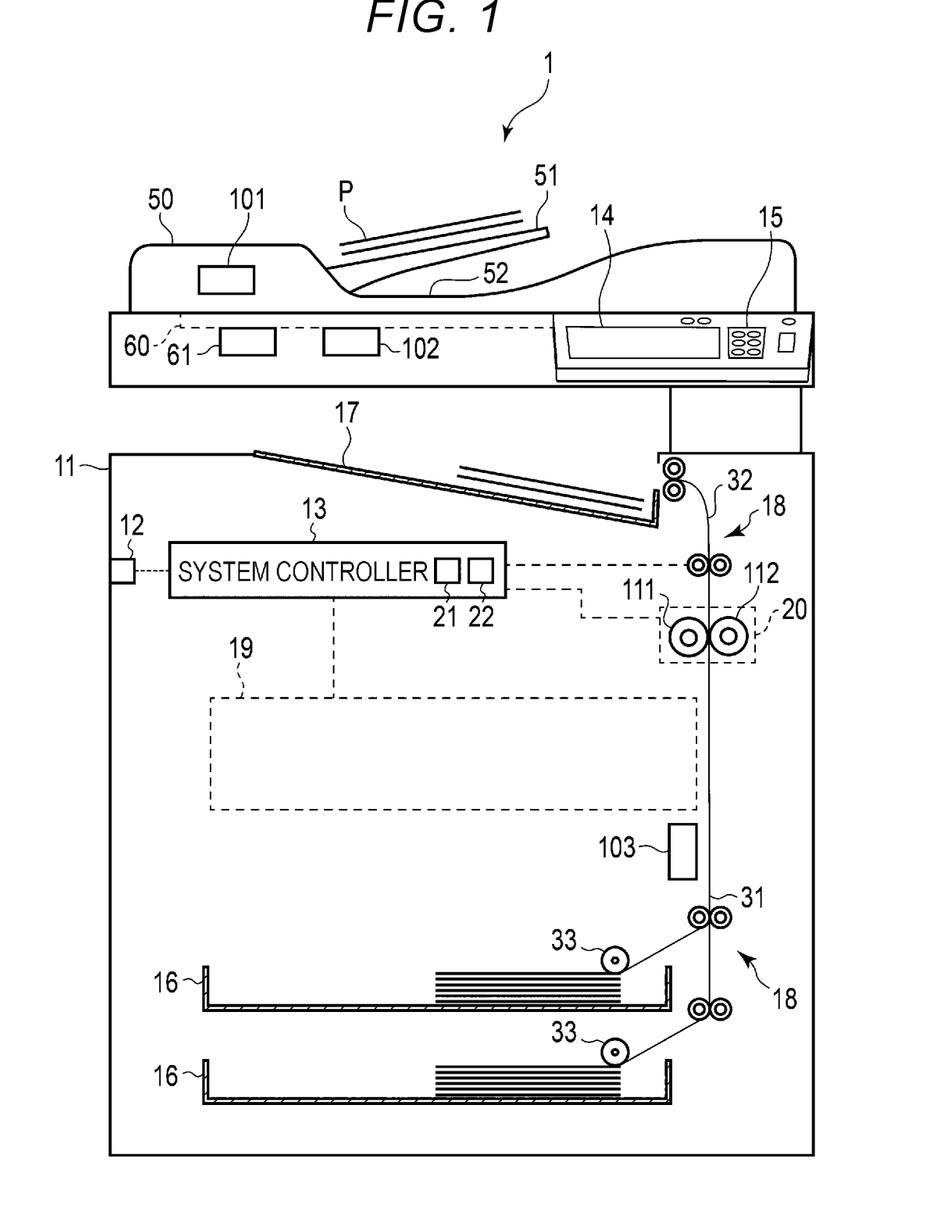
FIG. 1 is a diagram conceptually illustrating a configuration example of an image processing apparatus according to at least one embodiment.

FIG. 1 is a diagram conceptually illustrating a configuration example of the image processing apparatus 1 according to at least one embodiment. The image processing apparatus 1 (reading apparatus) is, for example, a multifunction printer (MFP) that performs various kinds of processing such as forming an image while conveying a print medium such as paper. For example, the image processing apparatus 1 is a solid-state scanning-type printer (for example, an LED printer) that scans an LED array that performs various kinds of processing such as forming an image while conveying a print medium.

For example, the image processing apparatus 1 has a configuration in which toner is received from a toner cartridge and an image is formed on a print medium by the received toner. The toner may be a monochromatic toner, or may be a color toner having a color such as cyan, magenta, yellow, or black.

As illustrated in FIG. 1, the image processing apparatus 1 includes a housing 11, a communication interface 12, a system controller 13, a display unit 14, an operation unit 15, a plurality of paper trays 16, a paper discharge tray 17, a conveyance unit 18, an image forming unit 19, a fixer 20, an ADF 50, a platen glass 60, a scanner 61, a reader and writer 101, a reader and writer 102, a reader and writer 103, and the like.

The housing 11 forms the outer shape of the image processing apparatus 1. The housing 11 accommodates or supports the communication interface 12, the system controller 13, the display unit 14, the operation unit 15 (user interface), the plurality of paper trays 16, the paper discharge tray 17, the conveyance unit 18, the image forming unit 19, the fixer 20, the platen glass 60, the scanner 61, the reader and writer 102, the reader and writer 103, and the like.

The communication interface 12 is an interface for communicating with other devices. For example, the communication interface 12 is used for communication with an external device. For example, the communication interface 12 is configured as a local area network (LAN) connector or the like. Further, the communication interface 12 may perform wireless communication with other devices in accordance with a standard such as Bluetooth (registered trademark) or Wi-fi (registered trademark).

The system controller 13 controls the image processing apparatus 1. The system controller 13 includes a processor 21, and a memory 22, for example.

The processor 21 is an arithmetic element that executes arithmetic processing. For example, the processor 21 is a CPU. The processor 21 performs various kinds of processing based on data such as a program stored in the memory 22. The processor 21 functions as a control unit capable of executing various operations by executing the program stored in the memory 22.

The processor 21 performs various kinds of information processing by executing the program stored in the memory 22. For example, the processor 21 generates a print job based on an image acquired from an external device via the communication interface 12. The processor 21 stores the generated print job in the memory 22.

Further, the processor 21 functions as a controller (engine controller) that controls the operations of the conveyance unit 18, the image forming unit 19, the fixer 20, the ADF 50, the scanner 61, the reader and writer 101, the reader and writer 102, and the reader and writer 103, for example, by executing the program stored in the memory 22.

The image processing apparatus 1 may be configured to include an engine controller, separately from the system controller 13. In this case, the system controller 13 supplies the engine controller with information necessary for control in the engine controller.

The memory 22 is a storage medium for storing a program and data used in the program. The memory 22 also functions as a working memory. That is, the memory 22 temporarily stores data being processed by the processor 21, or a program executed by the processor 21, for example.

The display unit 14 includes a display that displays a screen in response to a video signal input from a display control unit such as the system controller 13 or a graphic controller (not illustrated). For example, the display unit displays screens for various settings of the image processing apparatus 1 under the control of the system controller 13.

The operation unit 15 supplies an operation signal corresponding to the operation of an operation member to the system controller 13. The operation unit 15 is, for example, a touch sensor, a numeric keypad, a power key, a paper feed key, various function keys, a keyboard, or the like. The touch sensor acquires information indicating a designated position within a certain area. The touch sensor is configured as a touch panel integrally with the display unit 14 so that a signal indicating the touched position on the screen displayed on the display unit 14 is input to the system controller 13.

Each of the plurality of paper trays 16 is a cassette that houses a print medium (for example, wireless tag paper). The paper tray 16 has a structure capable of supplying a print medium from the outside of the housing 11. For example, the paper tray 16 has a structure that can be pulled out from the housing 11.

The paper discharge tray 17 is a tray that supports the print medium ejected from the image processing apparatus 1. The paper discharge tray 17 is formed in the middle of the housing 11. Further, the paper discharge tray 17 is formed as a part of the housing 11.

The image forming unit 19 forms a toner image on the print medium based on the control from the system controller 13. The image forming unit 19 forms a toner image of each color on the print medium.

For example, the image forming unit 19 forms an electrostatic latent image on a photoconductive body. The image forming unit 19 develops the electrostatic latent image by using the toner supplied from the toner cartridge. The image forming unit 19 transfers the toner image formed by developing the electrostatic latent image to a printing medium via an intermediate transfer body or the like.

The fixer 20 fixes the toner image by heating the print medium on which the toner image is transferred. The fixer 20 operates under the control of the system controller 13. The fixer 20 includes a heat roller 111, a press roller 112, and the like.

The heat roller 111 is a fixing rotating body that is rotated by a motor (not illustrated). The heat roller 111 has a hollow cored bar made of metal, and an elastic layer formed on the outer periphery of the cored bar. The heat roller 111 is heated to a high temperature by a heater disposed inside the hollow cored bar. The heater is, for example, a halogen heater. Further, the heater may be an induction heating (IH) heater that heats the cored bar by electromagnetic induction.

The press roller 112 is provided at a position facing the heat roller 111. The press roller 112 has a cored bar made of metal having a predetermined outer diameter, and an elastic layer formed on the outer periphery of the cored bar. The press roller 112 applies pressure to the heat roller 111 due to the stress applied from a tension member (not illustrated). If pressure is applied from the press roller 112 to the heat roller 111, a nip (fixing nip) in which the press roller 112 and the heat roller 111 are in close contact with each other is formed. The press roller 112 is rotated by a motor (not illustrated). The press roller 112 rotates to move the print medium that has entered the fixing nip and presses the print medium against the heat roller 111.

With the above configuration, the heat roller 111 and the press roller 112 apply heat and pressure to the print medium passing through the fixing nip. As a result, the toner image is fixed on the print medium that has passed through the fixing nip.

The platen glass 60 is formed on the upper surface of the housing 11. The platen glass 60 is formed of rectangular glass. The platen glass 60 carries a document such as wireless tag paper. The platen glass 60 is formed larger than the largest document that the scanner 61 can read. The platen glass 60 transmits light from an original document to the scanner 61.

The scanner 61 is formed on the lower part of the platen glass 60. The scanner 61 optically scans the original document and reads the image of the original document as image data. The scanner 61 reads the original document as a color image or a monochrome image. The scanner 61 includes a sensor array formed in the main scanning direction and the like. The scanner 61 moves the sensor array in the sub-scanning direction according to the control from the system controller 13 and reads the entire original document. The scanner 61 may be provided with a light or the like that illuminates the original document.

The ADF 50 is formed on the housing 11. The ADF 50 is rotatably installed near the back surface of the housing 11. That is, the ADF 50 jumps up. The ADF 50 sends out a wireless tag paper P on the platen glass 60. The ADF 50 includes a supply stand 51, and a paper discharge tray 52, for example.

The supply stand 51 is a stand for setting the wireless tag paper P. The supply stand 51 is formed so as to extend in a predetermined direction (here, to the right in FIG. 1). Further, the supply stand 51 is formed diagonally in order to supply the set wireless tag paper P to an internal pickup roller. In the supply stand 51, a plurality of sheets of wireless tag paper P may be set.

The ADF 50 uses the pickup roller to pick up the wireless tag paper P one by one. The ADF 50 supplies the picked-up wireless tag paper P to an internal conveyance roller.

The ADF 50 uses a conveyance roller, a conveyance belt, or the like to nip and convey the wireless tag paper P. The ADF 50 sends out the wireless tag paper P onto the platen glass 60 by using the conveyance roller, the conveyance belt, or the like. That is, the ADF 50 passes the wireless tag paper P through the platen glass 60 so that the paper can be read by the scanner 61 that stops at a predetermined position.

The ADF 50 sends out the wireless tag paper P to the platen glass 60 and then ejects the paper to the paper discharge tray 52.

The reader and writer 101 (communication unit) is installed in the ADF 50. The reader and writer 101 wirelessly communicates with a wireless tag 44 described later. The reader and writer 101 transmits and receives data to and from the wireless tag 44 included in the wireless tag paper P conveyed by the ADF 50.

The reader and writer 101 is an interface for wireless communication with the wireless tag 44 through an antenna or the like. The reader and writer 101 emits a transmitted wave through the antenna. For example, the reader and writer 101 outputs an unmodulated wave as a transmitted wave through the antenna. The reader and writer 101 receives the wave in response to the transmitted wave from the wireless tag 44 through the antenna and demodulates the wave. The reader and writer 101 acquires data from the wireless tag 44 by demodulating the received wave.

Further, the reader and writer 101 may transmit predetermined data to the wireless tag 44 based on the control from the processor 21. For example, the reader and writer 101 transmits a signal in which write data or the like is encoded to the wireless tag 44 through the antenna.

The reader and writer 102 (communication unit) is installed under the platen glass 60. The reader and writer 102 wirelessly communicates with the wireless tag 44 included in the wireless tag paper P mounted on the platen glass 60. Since the configuration of the reader and writer 102 is the same as that of the reader and writer 101, the description thereof will be omitted.

The reader and writer 103 is installed in the vicinity of the conveyance unit 18. Here, the reader and writer 103 is installed between the paper tray 16 and the image forming unit 19. The reader and writer 102 wirelessly communicates with the wireless tag 44 included in the wireless tag paper P conveyed to the conveyance unit 18. Since the configuration of the reader and writer 103 is the same as that of the reader and writer 101, the description thereof will be omitted.

Next, a configuration for conveying the print medium of the image processing apparatus 1 will be described. The conveyance unit 18 is a mechanism for transporting a print medium in the image processing apparatus 1. As illustrated in FIG. 1, the conveyance unit 18 includes a plurality of conveyance paths. For example, the conveyance unit 18 includes a paper feed conveyance path 31 and a paper discharge conveyance path 32.

The paper feed conveyance path 31 and the paper discharge conveyance path 32 each include a plurality of motors, a plurality of rollers, and a plurality of guides, for example (not illustrated). The plurality of motors rotate a shaft under the control of the system controller 13 to rotate the rollers linked to the rotation of the shaft. The plurality of rollers move the print medium by rotating. The plurality of guides control the conveyance direction of the print medium.

The paper feed conveyance path 31 takes in the print medium from the paper tray 16 and supplies the taken-in print medium to the image forming unit 19. The paper feed conveyance path 31 includes a pickup roller 33 corresponding to each paper tray. Each pickup roller 33 takes in the print medium of the paper tray 16 into the paper feed conveyance path 31.

The paper discharge conveyance path 32 is a conveyance path for ejecting the print medium on which the image is formed from the image forming unit 19 to the outside of the housing 11. The print medium ejected from the paper discharge conveyance path 32 is supported by the paper discharge tray 17.

The image processing apparatus 1 may have a configuration as required in addition to the configuration illustrated in FIG. 1, or may exclude a specific configuration.

Figure 2:
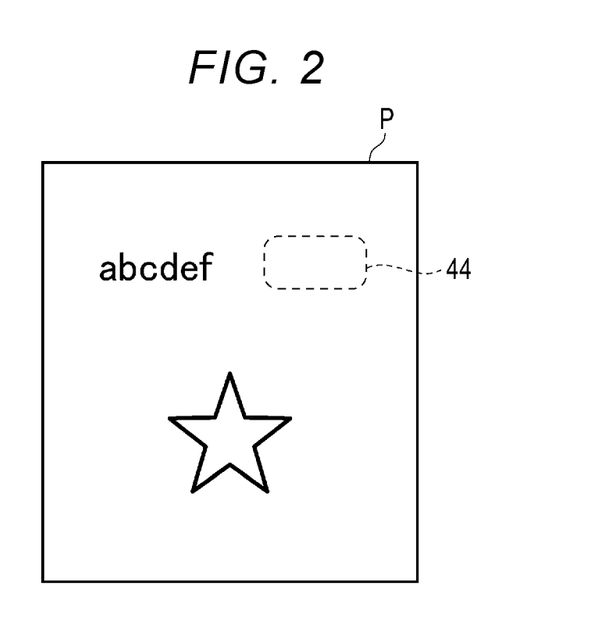
FIG. 2 is a diagram illustrating a configuration example of wireless tag paper.

Next, the wireless tag paper P will be described. FIG. 2 illustrates a configuration example of the wireless tag paper P. The wireless tag paper P is a medium on which various images are printed. The wireless tag paper P is made of paper, vinyl, plastic, or the like. The wireless tag paper P may be made of thermal paper or the like. As illustrated in FIG. 2, the wireless tag paper P includes a wireless tag 44, for example.

The wireless tag 44 is disposed at a predetermined position on the wireless tag paper P. In the example illustrated in FIG. 2, the wireless tag 44 is disposed at the upper right of the wireless tag paper P. The position where the wireless tag 44 is disposed is not limited to a specific position.

The wireless tag 44 is embedded between a plurality of layers constituting the wireless tag paper P. Further, at least one wireless tag 44 is embedded in one sheet of wireless tag paper P. The wireless tag 44 wirelessly writes predetermined data from an external apparatus, or wirelessly transmits predetermined data to the external apparatus.

Figure 3:
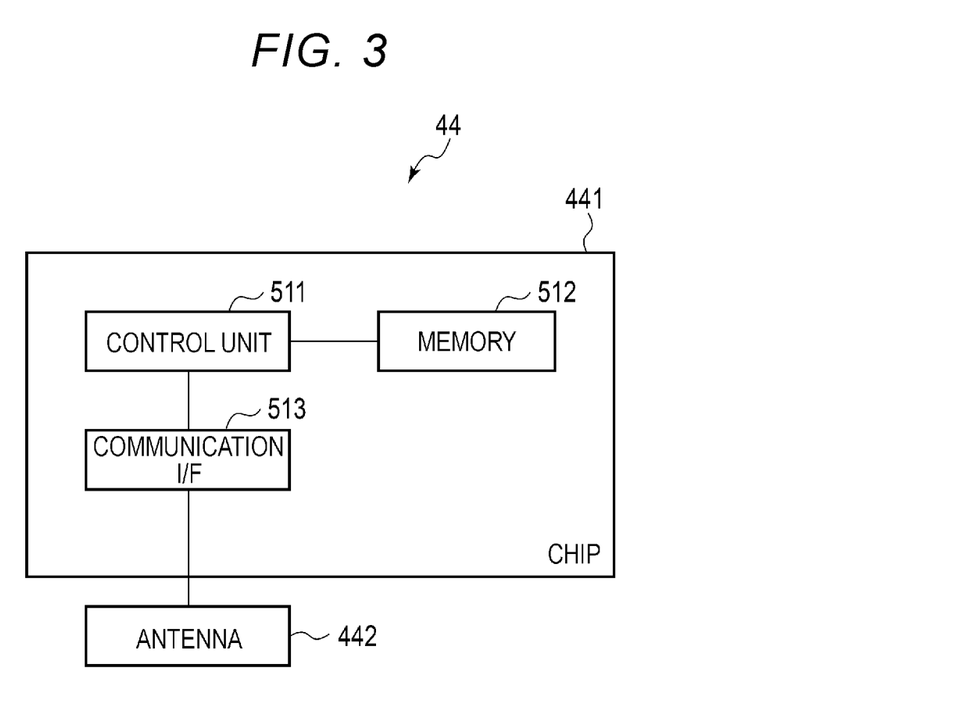
FIG. 3 is a block diagram illustrating a configuration example of a wireless tag.

Next, a configuration example of the wireless tag 44 will be described. FIG. 3 is a block diagram illustrating a configuration example of the wireless tag 44. As illustrated in FIG. 3, the wireless tag 44 includes a chip 441, an antenna 442, and the like.

The chip 441 includes a control unit 511, a memory 512, a communication interface 513, and the like. The control unit 511 has a function of controlling the operation of the entire chip 441. The control unit 511 may include an internal cache, various interfaces, and the like. For example, the control unit 511 realizes various kinds of processing by using the data stored in an internal memory or a memory. The control unit 511 may include a processor or the like. Further, the control unit 511 may include hardware such as a sequencer.

The memory 512 is a non-volatile memory to which data can be written. The memory 512 stores various data based on the operation of the control unit 511. Further, the memory 512 may store control data or the like in advance according to the operational use of the wireless tag 44. Further, the memory 512 may temporarily store data, for example, being processed by the control unit 511.

The communication interface 513 is an interface for communicating with an external apparatus through the antenna 442. The communication interface 513 may include a power supply unit, for example, that supplies electric power received from an external apparatus.

The antenna 442 is an antenna for wirelessly communicating with an external apparatus. The antenna 442 is also used to receive power from an external apparatus. For example, the antenna 442 may be formed in a mesh pattern in a predetermined area. Further, the antenna 442 may be formed in a ring shape in a predetermined area.

The wireless tag 44 may have a configuration as required in addition to the configuration illustrated in FIG. 3, or may exclude a specific configuration.

The wireless tag 44 is activated (becomes operable) by receiving power or the like from an external apparatus in a non-contact manner. The wireless tag 44 receives a radio wave from an external apparatus via the antenna 442, a modulation and demodulation circuit, and the like. The wireless tag 44 generates and activates an operating power supply and an operating clock by a power supply unit driven by the radio wave.

If the wireless tag 44 is activated, the chip 441 can perform data communication with an external apparatus through the antenna 442. The chip 441 reflects and absorbs radio waves by changing the impedance of the antenna 442.

For example, the chip 441 receives an access password or the like from the reader and writer 101 to 103 through the antenna 442 and establishes communication with the reader and writer 101 to 103. Further, the chip 441 transmits and receives predetermined data to and from the reader and writer 101 to 103 through the antenna 442.

For example, the wireless tag 44 is an RFID tag. Further, the wireless tag 44 may be GEN2 (Generation-2) compliant.

Figure 4:
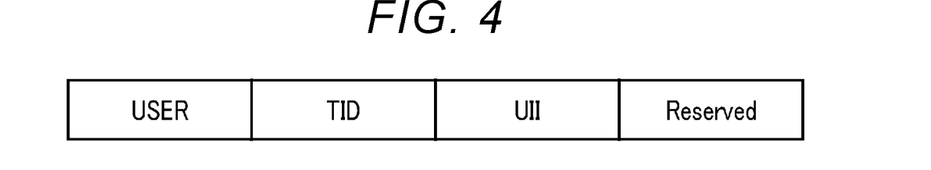
FIG. 4 is a diagram illustrating an example of a data structure of the wireless tag.

Next, the data structure of the memory 512 of the wireless tag 44 will be described. FIG. 4 illustrates an example of the data structure of the memory 512 of the wireless tag 44. As illustrated in FIG. 4, the memory 512 includes "USER", "TID", "UII", "Reserved", and the like. The memory 512 may have a configuration as required in addition to the configuration illustrated in FIG. 4, or may exclude a specific configuration.

"USER" is a memory (area) to which a user can write. Here, "USER" stores a tag and a value in association with each other.

"TID" is a memory for storing a Tag ID. "TID" is written by the vendor of the wireless tag 44. "TID" is a memory that cannot be rewritten by the user.

"UII" is a memory that stores UII. "UII" is a user-rewritable memory. For example, "UII" stores a company code, serial number, and the like as UII.

"Reserved" is a memory for storing a password for writing or rewriting to "USER", "UII", "Reserved", and the like.

Next, the functions realized by the image processing apparatus 1 will be described. The function realized by the image processing apparatus 1 is realized by the processor 21 executing the program stored in the memory 22 or the like.

First, the processor 21 has a function of receiving an input of settings related to scanning of the wireless tag paper P.

If the processor 21 receives an input such as an operation for acquiring an image and data from the wireless tag paper P through the operation unit 15, the display unit 14 displays a screen (setting screen) for receiving the input of the settings.

Figure 5:
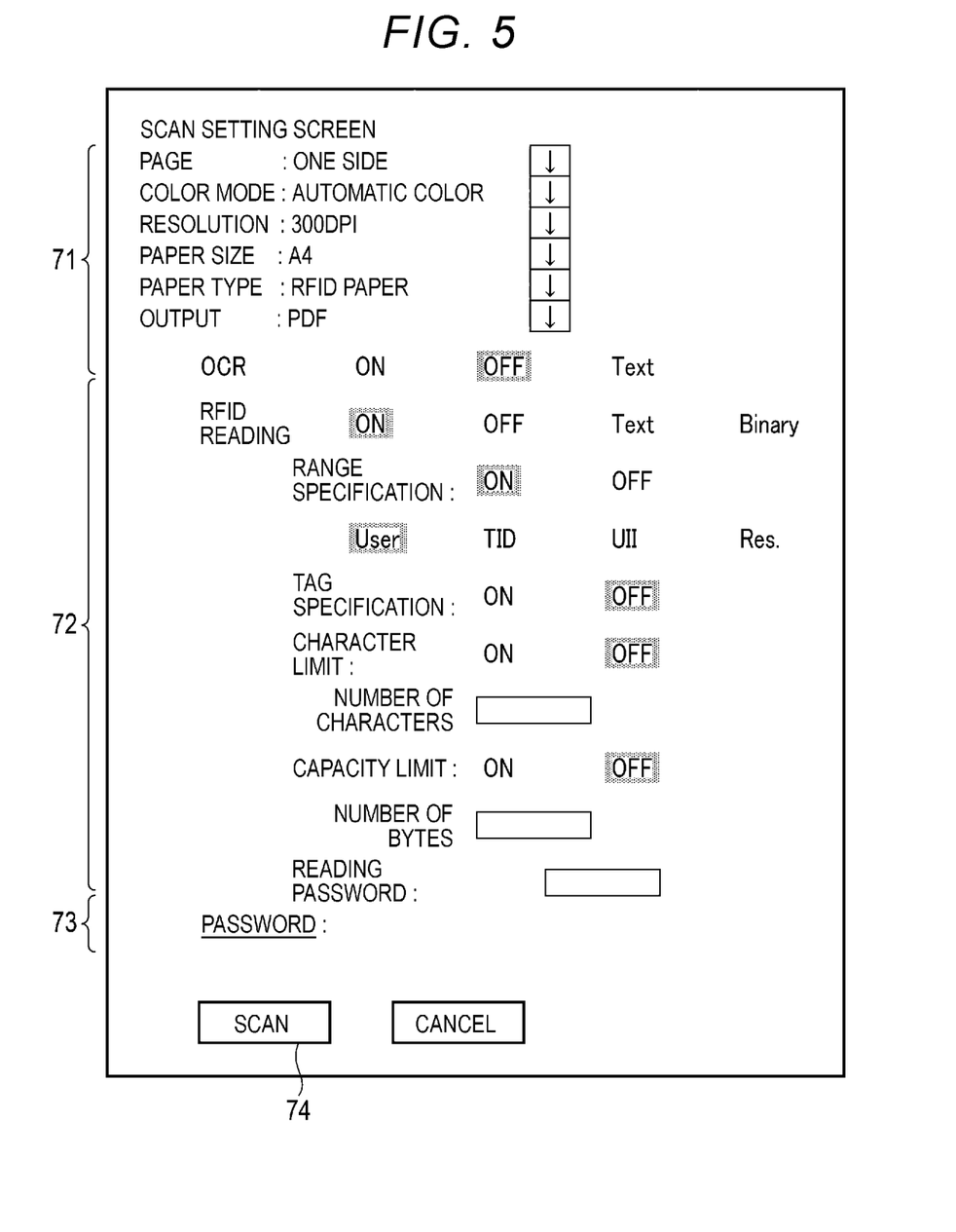
FIG. 5 is a diagram illustrating a display example of the image processing apparatus.

FIG. 5 illustrates an example of a setting screen displayed by the display unit 14. As illustrated in FIG. 5, the setting screen displays a display area 71, a display area 72, a display area 73, an icon 74, and the like.

The display area 71 receives an input of settings related to the acquisition of an image from the wireless tag paper P. Here, the display area 71 receives inputs for settings of "page", "color mode", "resolution", "paper size", "paper type", "output", and "OCR".

"Page" sets the side (one side or both sides) for scanning the image. Here, "page" indicates "one side". "Color mode" sets a scan color (color, monochrome, and the like). Here, "color mode" indicates an "automatic color" that automatically selects a scan color.

"Resolution" sets the resolution (DPI) to scan at. Here, "resolution" indicates "300 DPI". "Paper size" sets the size of the paper to be scanned.

Here, "paper size" indicates "A4".

"Paper type" sets the type of paper to be scanned. Here, "paper type" indicates "RFID paper" indicating the wireless tag paper P. "Output" sets the format of the file generated by the processor 21. Here, "output" indicates "PDF". That is, the processor 21 generates a portable document format (PDF) file.

"OCR" sets optical character recognition (OCR) for the scanned image. For "OCR", any one of "ON", "OFF", or "Text" is set. "ON" indicates that the processor 21 performs OCR processing on a scanned image and embeds a processing result in a PDF file. "OFF" indicates that the processor 21 does not perform OCR processing on the scanned image. "Text" indicates that the processor 21 performs OCR processing on the scanned image and generates a text file illustrating the processing result, separately from the PDF file. Here, "OCR" indicates "OFF".

The display area 72 receives an input of settings related to the acquisition of data from the wireless tag paper P. That is, the display area 72 receives the inputs of the settings related to the acquisition of data from the wireless tag 44. Here, the display area 72 receives an input of settings of "RFID reading", "range specification", "tag designation", "character limit", "capacity limit", and "reading password".

"RFID reading" sets whether or not to read the wireless tag 44. For "RFID reading", any one of "ON", "OFF", "Text" or "Binary" is set. "ON" indicates that the processor 21 reads the data from the wireless tag 44 and embeds a reading result in the PDF file. "OFF" indicates that the processor 21 does not read data from the wireless tag 44. "Text" indicates that the processor 21 reads the data from the wireless tag 44 and generates a text file illustrating the reading result, separately from the PDF file. "Binary" indicates that the processor 21 reads data from the wireless tag 44 and generates binary data indicating the reading result, separately from the PDF file. Here, "RFID reading" indicates "ON".

"range specification" sets the memory (area) that the processor 21 reads from the wireless tag 44. "range specification" indicates either "ON" or "OFF". "ON" specifies the memory that the processor 21 reads from the wireless tag 44. If "range specification" is "ON", any one of "USER", "TID", "UII", and "Reserved" is set as the memory to be read by the processor 21.

"OFF" does not specify the memory that the processor 21 reads from the wireless tag 44. That is, the processor 21 reads data from "USER", "TID", "UII", and "Reserved" of the wireless tag 44. Here, the "range specification" is "ON" and indicates "USER".

"tag specification" sets a tag of data that processor 21 acquires from the wireless tag 44. Here, "tag specification" sets the tag of the data to be read from "USER". Further, "tag specification" indicates "OFF" in which no tag is specified. That is, the processor 21 acquires the data of each tag stored in "USER".

The "character limit" sets an upper limit on the number of characters of data that processor 21 acquires from the wireless tag 44. Here, "character limit" indicates "OFF" in which the upper limit is not set. If the "character limit" is "ON" in which the upper limit is set, the input of the upper limit on the number of characters is received.

The "capacity limit" sets an upper limit of the amount of data that the processor 21 acquires from the wireless tag 44. Here, "capacity limit" indicates "OFF" in which the upper limit is not set. If the "capacity limit" is "ON" in which the upper limit is set, the input of the upper limit number of bytes is received.

The "reading password" sets a password for reading data from the wireless tag 44. Here, since the password is not set for the wireless tag 44, the "reading password" is blank.

The display area 73 receives an input of settings related to the file to be generated by the processor 21. Here, the display area 73 receives the input of the "password" setting.

For "password", set the password of the file (PDF file in this case) generated by the processor 21. Here, the "password" is blank (no password).

The icon 74 is an icon for confirming the settings. If the processor 21 detects a tap on the icon 74, the processor 21 confirms the settings entered in the setting screen.

Further, the processor 21 has a function of acquiring an image and data from the wireless tag paper P.

Here, it is assumed that the wireless tag paper P is set on the ADF 50 or the platen glass 60.

If the processor 21 detects a tap on the icon 74, the processor 21 reads an image from the wireless tag paper P based on the confirmed settings. Further, the processor 21 reads data from the wireless tag 44 of the wireless tag paper P based on the confirmed settings.

First, a case where the wireless tag paper P is set in the ADF 50 will be described. That is, the wireless tag paper P is set on the supply stand 51 of the ADF 50.

The processor 21 causes the ADF 50 to pull the wireless tag paper P inside. If the wireless tag paper P is pulled into the ADF 50, the processor 21 causes the reader and writer 101 to acquire data from the wireless tag 44 of the wireless tag paper P pulled inside. Here, the processor 21 causes the reader and writer 101 to acquire data from the "USER" of the memory 512 of the wireless tag 44.

If the reader and writer 101 acquires the data, the processor 21 causes the scanner 61 to read the image of the wireless tag paper P. For example, the processor 21 moves the scanner 61 into a predetermined position. If the scanner 61 is moved, the processor 21 causes the ADF 50 to send out the wireless tag paper P to the platen glass 60.

The scanner 61 reads an image from the wireless tag paper P while the ADF 50 sends out the wireless tag paper P to the platen glass 60. If the scanner 61 reads the image, the ADF 50 discharges the wireless tag paper P to the paper discharge tray 52.

Next, a case where the wireless tag paper P is set in the platen glass 60 will be described. The processor 21 moves the scanner 61 in the sub-scanning direction. The processor 21 causes the scanner 61 to acquire an image while the scanner 61 is moving.

Further, the processor 21 causes the reader and writer 102 to acquire data from the wireless tag 44 of the wireless tag paper P. Here, the processor 21 causes the reader and writer 102 to acquire data from the "USER" of the memory 512 of the wireless tag 44.

Further, the processor 21 has a function of selecting the data to be stored in a file from the data from the wireless tag 44.

If the data is acquired from the wireless tag 44, the processor 21 causes the display unit 14 to display the acquired data. Here, the processor 21 causes the display unit 14 to display a screen (display screen) illustrating data from the "USER".

Figure 6:
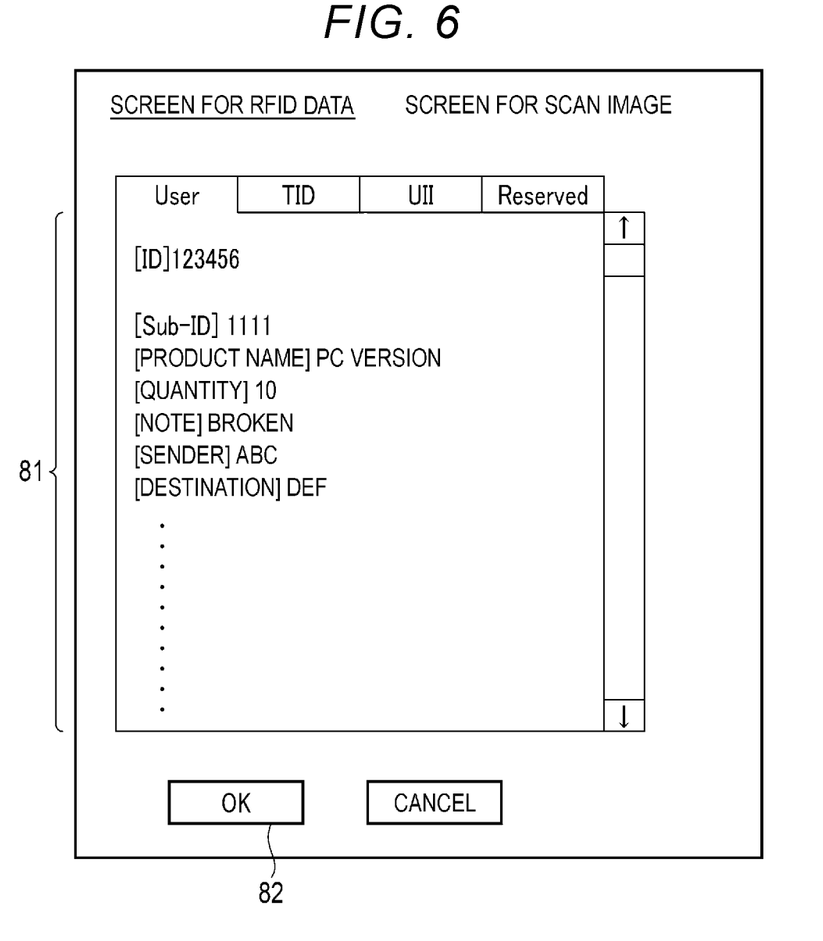
FIG. 6 is a diagram illustrating a display example of the image processing apparatus.

FIG. 6 illustrates an example of a display screen displayed by the display unit 14. As illustrated in FIG. 6, the display screen displays a display area 81 and an icon 82.

The display area 81 displays the data from the wireless tag 44. Here, the display area 81 displays the data from "USER". The display area 81 displays the tag and the value in association with each other as data from "USER". For example, the display area 81 displays "ID" as a tag and "123456" as a value in association with each other.

The icon 82 is an icon for completing the display of data. If the processor 21 detects a tap on the icon 82, the processor 21 causes the display unit 14 to erase the display screen.

If the processor 21 acquires data from "TID", "UII", and "Reserved", the processor 21 may display the data from "TID", "UII", and "Reserved" on each tab of the display screen.

If the display of the data is completed, the processor 21 selects the data to be stored in a file (here, a PDF file). That is, the processor 21 receives an input of an operation for selecting data (a part of data) from the wireless tag 44. Here, the processor 21 receives a tag selection as a data selection.

The processor 21 causes the display unit 14 to display a screen (selection screen) for receiving an operation for selecting data.

Figure 7:
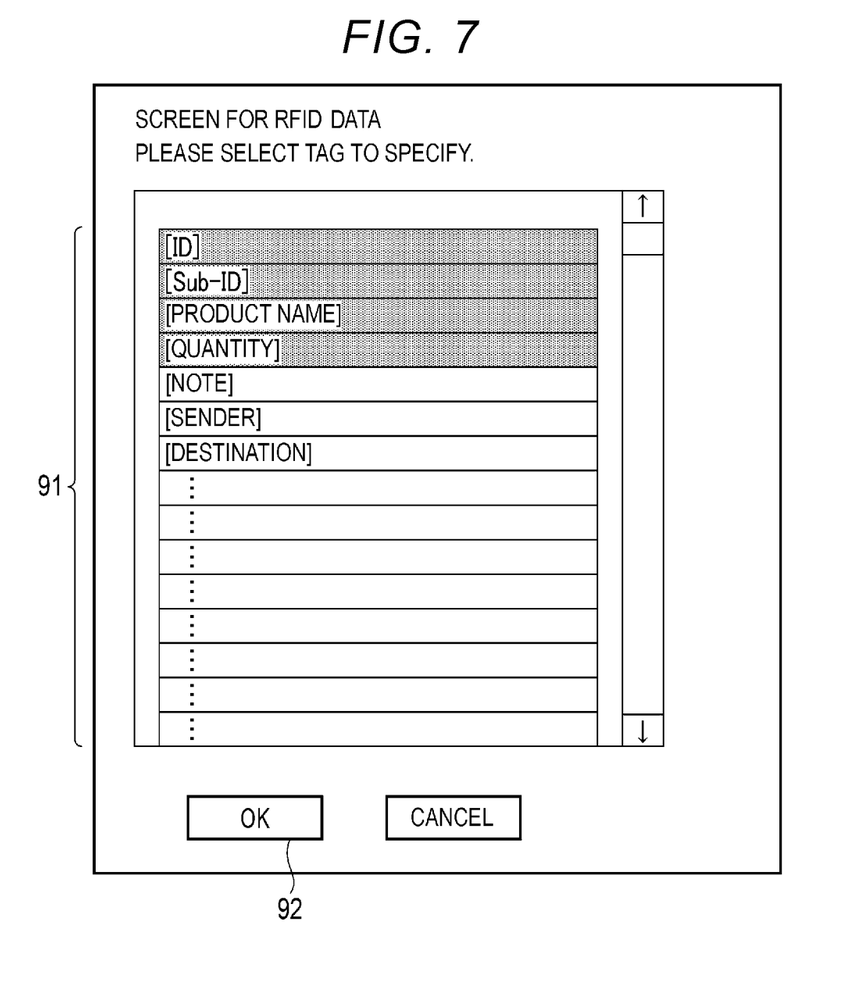
FIG. 7 is a diagram illustrating a display example of the image processing apparatus.

FIG. 7 illustrates an example of a selection screen displayed by the display unit 14. As illustrated in FIG. 7, the selection screen displays a display area 91 and an icon 92.

The display area 91 receives an operation for selecting data. Here, the display area 91 receives a tag selection. The display area 91 displays the tag of the data from "USER". The display area 91 receives a tap on the tag as a tag selection. The display area 91 changes the color of the selected tag (tapped tag).

The icon 92 is an icon for confirming the selection. If the processor 21 detects a tap on the icon 92, the processor 21 confirms the selection entered in the selection screen.

Further, the processor 21 has a function of generating a file in which the acquired image and the selected data are associated with each other.

Here, the processor 21 generates a PDF file as illustrated in FIG. 5. The processor 21 also generates a searchable PDF file.

Figure 8:
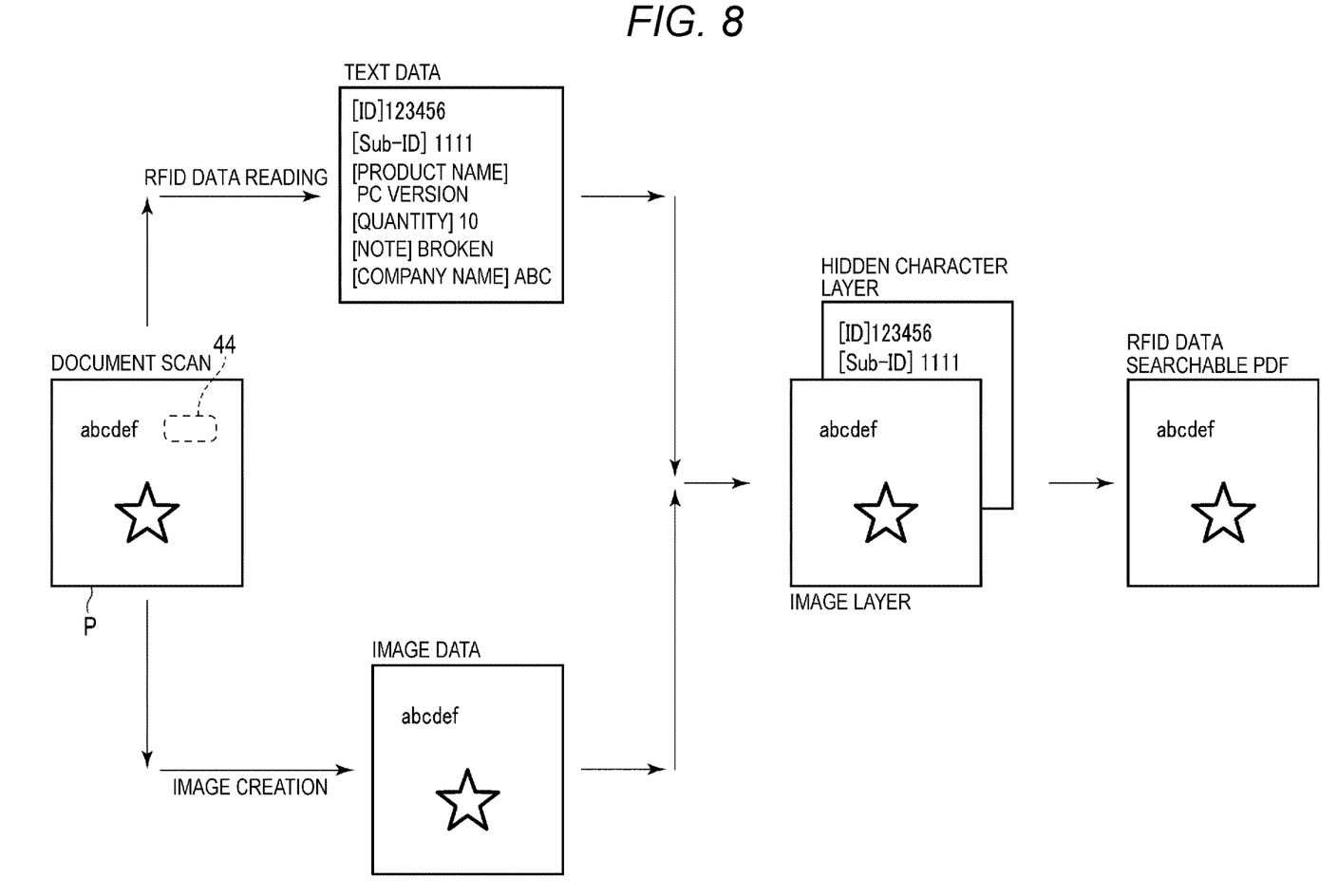
FIG. 8 is a diagram illustrating an operation example of the image processing apparatus.

FIG. 8 is a diagram for illustrating an operation example in which the processor 21 generates a PDF file.

First, the processor 21 generates text data indicating the selected tag and the value corresponding to the tag. If the text data is generated, the processor 21 generates a layer (hidden character layer) containing the text data as a hidden character string. Further, the processor 21 generates an image layer illustrating an image of the wireless tag paper P from the image data acquired by the scanner 61.

If the hidden character layer and the image layer are generated, the processor 21 superimposes the image layer and the hidden character layer to generate a PDF file. That is, the generated PDF file is a file in which the data from the wireless tag 44 is hidden and embedded in the image printed on the wireless tag paper P. The generated PDF file is a searchable PDF file that is searched by using the character string of the hidden character layer as a key.

Figure 9:
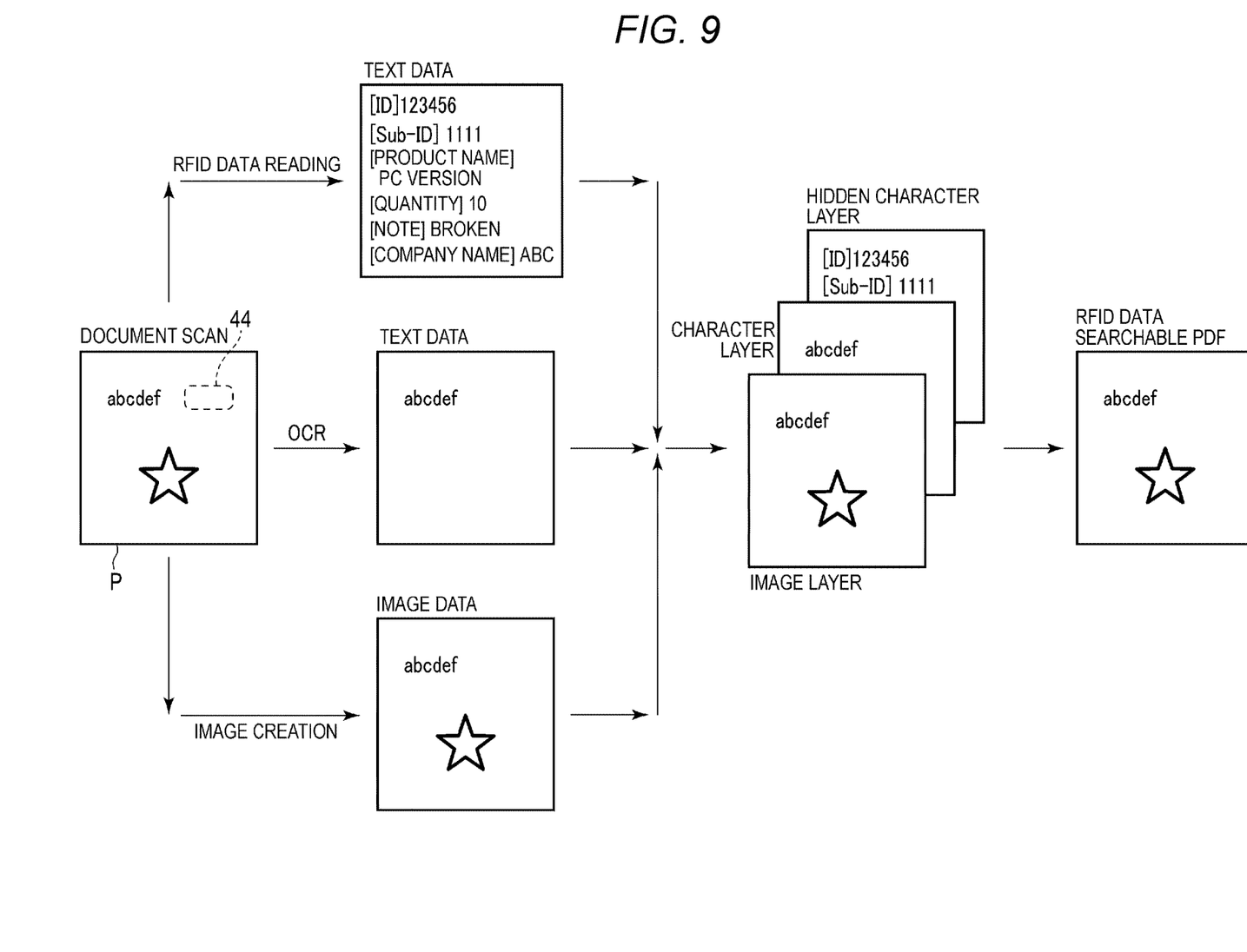
FIG. 9 is a diagram illustrating an operation example of the image processing apparatus.

Next, a modification example of the PDF file will be described. Here, the PDF file contains the result of OCR processing of the image from the wireless tag paper P. That is, an operation example in which the processor 21 generates a PDF file if the item of "OCR" is "ON" on the setting screen will be described.

FIG. 9 is a diagram for illustrating an operation example in which the processor 21 generates a PDF file if the item of "OCR" is "ON" on the setting screen.

As described above, the processor 21 generates a layer (hidden character layer) containing text data as a hidden character string. Further, the processor 21 generates an image layer from the image data acquired by the scanner 61.

In addition, the processor 21 performs OCR processing on the image data. That is, the processor 21 reads a character string from the image data. The method of OCR processing by the processor 21 is not limited to a specific method.

If the OCR processing is performed, the processor 21 generates a layer (character layer) indicating text data indicating a processing result. In the character layer, text data indicating the processing result is set at a position corresponding to the position of each character string in the image data.

If the hidden character layer, the character layer, and the image layer are generated, the processor 21 superimposes the image layer, the character layer, and the hidden character layer to generate a PDF file. That is, the generated PDF file is a file in which the data from the wireless tag 44 and the OCR processing result are hidden and embedded in the image printed on the wireless tag paper P.

If the PDF file is generated, the processor 21 stores the generated PDF file in the memory 22. Further, the processor 21 may transmit the generated PDF file to an external apparatus through the communication interface 12.

Figure 10:
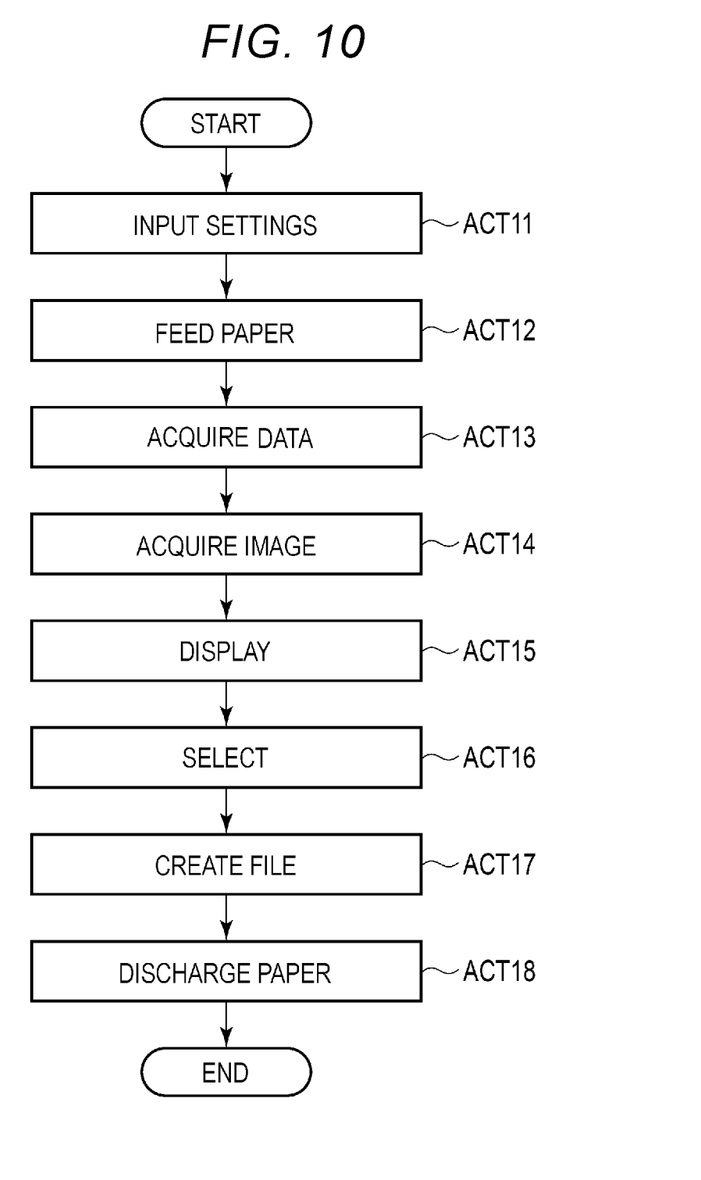
FIG. 10 is a flowchart illustrating an operation example of the image processing apparatus.

Next, an operation example of the image processing apparatus 1 will be described. FIG. 10 is a flowchart for illustrating an operation example of the image processing apparatus 1.

First, the processor 21 of the image processing apparatus 1 receives an input of settings related to scanning (ACT 11). When receiving the input of the settings related to scanning, the processor 21 uses the ADF 50 to feed the wireless tag paper P (ACT 12). If the wireless tag paper P is set in the platen glass 60, the processor 21 does not have to execute ACT 12.

If the wireless tag paper P is fed, the processor 21 uses the reader and writer 101 or the reader and writer 102 to acquire data from the wireless tag 44 of the wireless tag paper P (ACT 13). If the data is acquired from the wireless tag 44, the processor 21 acquires the image data from the wireless tag paper P by using the scanner 61 (ACT 14).

If the image data is acquired, the processor 21 displays the data from the wireless tag 44 on the display unit 14 (ACT 15). If the data is displayed on the display unit 14, the processor 21 receives an input of an operation for selecting data (ACT 16).

When receiving the input of the operation for selecting the data, the processor 21 generates a file based on the image data and the selected data (ACT 17). When generating the file, the processor 21 uses the ADF 50 to discharge the wireless tag paper P (ACT 18). If the wireless tag paper P is set in the platen glass 60, the processor 21 does not have to execute ACT 19. If the wireless tag paper P is discharged, the processor 21 ends the operation.

The order of ACT 13 and ACT 14 may be reversed. The processor 21 may also execute ACT 18 after ACT 14. The processor 21 may also generate a file that displays the text data from the wireless tag 44.

Further, the processor 21 does not have to receive the selection of the data to be stored in the file. In this case, the processor 21 may generate a file in which the data from the wireless tag 44 is embedded in the scanned image.

The processor 21 may also generate an extensible markup language (XML) file or an office open XML (OOXML) file. The format of the file generated by the processor 21 is not limited to a specific configuration.

Further, the processor 21 may print an image on the wireless tag paper P and store the data in the wireless tag 44. For example, the paper tray 16 stores the wireless tag paper P. The processor 21 uses the reader and writer 103 to store data in the wireless tag 44 of the wireless tag paper P from the paper tray 16. Further, the processor 21 prints an image on the wireless tag paper P by using the image forming unit 19 and the fixer 20, for example.

The image processing apparatus configured as described above acquires an image from paper provided with a wireless tag and acquires data from the wireless tag. The image processing apparatus generates a file in which the data from the wireless tag is embedded as a hidden layer in the image from the paper. As a result, the image processing apparatus can effectively manage the image printed on the paper and the data to be stored in the wireless tag.

While certain embodiments have been described, these embodiments have been presented by way of example only, and are not intended to limit the scope of the disclosure. Indeed, the novel embodiment described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A reading apparatus comprising:
a communication interface configured to communicate with a wireless tag provided on a paper;
a scanner configured to scan the paper to read an image from the paper as image data; and
a processor configured to:
acquire data from the wireless tag using the communication interface,
acquire the image data from the scanner, and
generate a file in which the data is embedded in the image as hidden characters.

2. The apparatus according to claim 1, wherein
the file is a PDF file including an image layer and a hidden character layer, the image layer containing the image, and the hidden character layer containing the data as hidden characters.

3. The apparatus according to claim 1, further comprising:
a user interface configured to receive an input of an operation, wherein
the processor is configured to:
receive, through the user interface, an input of an operation for selecting a part of the data, and
generate the file in which the part of the data selected is embedded as hidden characters.

4. The apparatus according to claim 1, wherein
the processor is configured to:
read a character string described in the image, and
generate the file in which the character string is further embedded.

5. The apparatus according to claim 1, wherein
the wireless tag is an RFID tag.

6. The apparatus according to claim 1, wherein the reading apparatus includes a multifunction printer.

7. The apparatus according to claim 1, wherein the communication interface includes a reader and a writer.

8. The apparatus according to claim 1, further comprising a display, wherein the processor is configured to cause the display to display the data, when the data is acquired.

9. The apparatus according to claim 8, wherein the processor is configured to select a part of data from the acquired data to be stored in the file.

10. The apparatus according to claim 2, wherein the PDF file is searchable using a character string of the hidden character layer as a key.

11. The apparatus according to claim 3, where the user interface includes at least one of a touch sensor or a keyboard.

12. A method executed by a processor, the method comprising:
acquiring data from a wireless tag provided on a paper,
acquiring an image from the paper as image data, and
generating a file in which the data is embedded in the image as hidden characters.

13. The method according to claim 12, wherein
the file is a PDF file including an image layer and a hidden character layer, the image layer containing the image, and the hidden character layer containing the data as hidden characters.

14. The method according to claim 12, further comprising:
receiving an input of an operation for selecting a part of the data, and
generating the file in which the part of the data selected is embedded as hidden characters.

15. The method according to claim 12, further comprising:
reading a character string described in the image, and
generating the file in which the character string is further embedded.

* * * * *